(12) United States Patent
Takahashi et al.

(10) Patent No.: US 8,089,565 B2
(45) Date of Patent: Jan. 3, 2012

(54) DIGITAL SIGNAL RECEIVER AND METHOD FOR CONTROLLING THE SAME

(75) Inventors: Satoshi Takahashi, Osaka (JP); Ryogo Yanagisawa, Osaka (JP); Shuji Kato, Osaka (JP); Shinichi Hashimoto, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1458 days.

(21) Appl. No.: 11/579,596

(22) PCT Filed: Dec. 15, 2004

(86) PCT No.: PCT/JP2004/018721
§ 371 (c)(1),
(2), (4) Date: Nov. 6, 2006

(87) PCT Pub. No.: WO2005/117451
PCT Pub. Date: Dec. 8, 2005

(65) Prior Publication Data
US 2008/0136970 A1    Jun. 12, 2008

(30) Foreign Application Priority Data
May 26, 2004    (JP) .................................. 2004-156337

(51) Int. Cl.
*H04N 5/63* (2006.01)
(52) U.S. Cl. .......... 348/730; 348/725; 348/705; 348/790
(58) Field of Classification Search .......... 348/725–731, 348/736, 737, 738, 553–555, 790; 455/213, 455/222, 296, 188.1, 192.3, 174.1; 725/131, 725/139, 151; *H04N 5/63, 5/455*
See application file for complete search history.

(56) References Cited

U.S. PATENT DOCUMENTS

| | | | | |
|---|---|---|---|---|
| 6,710,816 | B1 * | 3/2004 | Minami | 348/554 |
| 7,477,325 | B2 * | 1/2009 | Zhu et al. | 348/725 |
| 2002/0040481 | A1 * | 4/2002 | Okada et al. | 725/131 |
| 2003/0152160 | A1 | 8/2003 | Bauch et al. | |
| 2004/0080671 | A1 | 4/2004 | Siemens et al. | |

FOREIGN PATENT DOCUMENTS

| | | |
|---|---|---|
| EP | 1 288 892 A2 | 3/2003 |
| JP | 06-070264 | 3/1994 |
| JP | 7-15676 | 1/1995 |

(Continued)

OTHER PUBLICATIONS

English Translation of Japanese Notice of Reasons for Rejection issued in Japanese Patent Application No. 2006-513804, mailed Jan. 12, 2010.

(Continued)

Primary Examiner — Trang U Tran
(74) Attorney, Agent, or Firm — McDermott Will & Emery LLP

(57) ABSTRACT

A digital signal receiver comprises a signal separating section (11), a clock signal generating section (12), a video data processing section (14), an audio data processing section (15), and a control section (17). The clock signal generating section (12) generates an operation clock signal (105) for the signal separating section (11), the video data processing section (14), and the audio data processing section (15). The control section (17) pauses the signal separating section (11), the video data processing section (14), and the audio data processing section (15) until receiving a clock stability signal (108) indicating that the operation clock signal (105) is stable, the clock stability signal (108) being generated by the clock signal generating section (12).

5 Claims, 4 Drawing Sheets

FOREIGN PATENT DOCUMENTS

| | | | |
|---|---|---|---|
| JP | 8-307304 | | 11/1996 |
| JP | 10-254501 | | 9/1998 |
| JP | 11-252479 | * | 9/1999 |
| JP | 2000-261497 | | 9/2000 |
| JP | 2001-117903 | | 4/2001 |
| JP | 2001-189674 | | 7/2001 |
| JP | 2002-202881 | | 7/2002 |
| JP | 2003-209845 | | 7/2003 |

OTHER PUBLICATIONS

European Search Report issued in European Patent Application No. 04807080.9-2223 mailed Jul. 7, 2010.

Eidson, S., et al., "30.2: HDMI: High-Definition Multimedia Interface", 2003 SID International Symposium, May 20, 2003, p. 1024, vol. XXXIV, Baltimore MD, USA.

* cited by examiner

DIGITAL SIGNAL RECEIVER AND METHOD FOR CONTROLLING THE SAME

RELATED APPLICATIONS

This application is the U.S. National Phase under 35 U.S.C. §371 of International application No. PCT/JP2004/018721, filed on Dec. 15, 2004, which in turn claims the benefit of JP 2004-156337, filed on May 26, 2004, the disclosures of which applications are incorporated by reference herein.

TECHNICAL FIELD

The present invention relates to a digital signal receiver, and more particularly, to a digital signal receiver suitable for receivers for digital AV (audio and video) signals, such as digital televisions, flat display panels, digital video recorders, and the like.

BACKGROUND ART

In digital AV signal transmission systems in conformity with the DVI (Digital Visual Interface) standard, the HDMI (High-Definition Multimedia Interface) standard, and the like, a digital AV signal in which video data and audio data are multiplexed is serially transmitted. Digital signal receivers decode received a digital AV signal, and further, separate the digital AV signal into video data and audio data, which are in turn output. Audio data is typically overlaid, in the form of packets, on blanking intervals of video data. An audio data processing section in the digital signal receiver converts audio data in the form of packets into audio data in the form of a stream, which is in turn output. Also, a video data processing section in the digital signal receiver performs a process, such as format conversion or the like, with respect to the separated video data, and outputs the processed video data.

Also, in the digital AV signal transmission system, a clock signal is transmitted in a transmission line separated from an AV signal transmission line. The digital signal receiver generates its own operation clock signal from the given clock signal.

On the other hand, there is a digital signal receiver which comprises a plurality of signal receiving sections each receiving a digital AV signal and a clock signal and can receive a plurality of channels of digital AV signals. Such an apparatus typically comprises a selection section for selecting any one of a plurality of channels of digital AV signals and clock signals. A video data processing section and an audio data processing section process video data and audio data of a channel selected by the selection section. In other words, each signal receiving section is exclusively used.

Regarding conventional packet receivers which receive encrypted packets, when a received packet is not encrypted, power supply to a decoding means for decoding packets is paused, thereby reducing power consumption in the apparatus (see, for example, Patent Document 1).

Patent Document 1: Japanese Patent Unexamined Publication No. 2000-261497 (page 4, FIG. 1)

DISCLOSURE OF THE INVENTION

Problems to be Solved by the Invention

The above-described operation clock signal is generated by a phase locked loop provided in the digital signal receiver. In general, some time is required for the phase locked loop to output a stable signal after receiving a clock signal. In conventional digital signal receivers, a section for receiving and processing a digital AV signal, a section for decoding data, and the like are operated even during the time when the operation clock signal is not yet stable. Also, even when a received digital AV signal does not include video data and/or audio data, the video data processing section and/or the audio data processing section is operated. Further, in a digital signal receiver which receives a plurality of channels of digital AV signals, signal receiving sections for channels which are not selected are operated. Thus, in conventional digital signal receivers, power is wasted in many respects.

Also, in the above-described packet receiver, encryption information needs to be added to a packet header in order to determine whether or not data is encrypted, in units of a packet. Further, a header separating means for separating a packet header and a header analyzing means for analyzing a header are required, resulting in an increase in circuit scale of the apparatus.

In view of the above-described problems, an object of the present invention is to provide a digital signal receiver which reduces power consumption in the apparatus without particularly increasing the circuit scale.

Solution to the Problems

To achieve the above-described object of the present invention, a digital signal receiver comprises a signal separating section for separating video data and audio data from a given digital AV signal, a video data processing section for processing the video data separated by the signal separating section, an audio data processing section for processing the audio data separated by the signal separating section, and a clock signal generating section for, from a given first clock signal, generating a second clock signal for operating the signal separating section, the video data processing section, and the audio data processing section. The digital signal receiver further comprises a control section for controlling an operating state of a control subject based on a clock stability signal indicating that the second clock signal generated by the clock signal generating section is stable, where the control subject is at least one of the signal separating section, the video data processing section, and the audio data processing section, wherein the control section pauses the control subject until receiving the clock stability signal.

Thereby, a control subject which is operated in synchronization with the second clock signal is not operated until the second clock signal generated by the clock signal generating section becomes stable.

Also, a digital signal receiver comprises a signal separating section for separating video data and audio data from a given digital AV signal, a video data processing section for processing the video data separated by the signal separating section, and an audio data processing section for processing the audio data separated by the signal separating section. The digital signal receiver further comprises a control section for controlling an operating state of a control subject based on a determination signal indicating whether or not video data and audio data are included in the digital AV signal, where the control subject is at least one of the video data processing section and the audio data processing section, wherein the control section pauses the video data processing section when the determination signal indicates that video data is not included in the digital AV signal, and pauses the audio data processing section when the determination signal indicates that audio data is not included in the digital AV signal.

Thereby, when the determination signal indicates that video data is not included in the digital AV signal, the video data processing section for processing video data is not operated. Also, when the determination signal indicates that audio data is not included in the digital AV signal, the audio data processing section for processing audio data is not operated.

Also, a digital signal receiver comprises a plurality of signal receiving sections each having a signal separating section for separating video data and audio data from a given digital AV signal, and a clock signal generating section for generating, from a given first clock signal, a second clock signal for operating the signal separating section, and a selection section for selecting any one of the plurality of signal receiving sections based on a given select signal, and outputting the audio data, the video data and the second clock signal output from the selected signal receiving section. The digital signal receiver further comprises a control section for controlling an operating state of a control subject based on the select signal, where the control subject is at least one of the signal separating section and the clock signal generating section, wherein the control section pauses the control subject belonging to one of the plurality of signal receiving sections which is not selected by the select signal.

Thereby, a control subject belonging to one of the plurality of signal receiving sections which is not selected by the select signal is not operated.

Also, in a method for controlling a digital signal receiver which comprises a signal separating section for separating video data and audio data from a given digital AV signal, a video data processing section for processing the video data separated by the signal separating section, an audio data processing section for processing the audio data separated by the signal separating section, and a clock signal generating section for, from a given first clock signal, generating a second clock signal for operating the signal separating section, the video data processing section, and the audio data processing section, a control subject is paused until receiving a clock stability signal indicating that the second clock signal generated by the clock signal generating section is stable, where the control subject is at least one of the signal separating section, the video data processing section, and the audio data processing section.

Thereby, a control subject which is operated in synchronization with the second clock signal is not operated until the second clock signal generated by the clock signal generating section becomes stable.

Also, in a method for controlling a digital signal receiver which comprises a signal separating section for separating video data and audio data from a given digital AV signal, a video data processing section for processing the video data separated by the signal separating section, and an audio data processing section for processing the audio data separated by the signal separating section, the video data processing section is paused when a determination signal indicating whether or not video data and audio data are included in the digital AV signal, indicates that video data is not included in the digital AV signal, and the audio data processing section is paused when the determination signal indicates that audio data is not included in the digital AV signal.

Thereby, when the determination signal indicates that video data is not included in the digital AV signal, the video data processing section for processing video data is not operated. Also, when the determination signal indicates that audio data is not included in the digital AV signal, the audio data processing section for processing audio data is not operated.

Also, in a method for controlling a digital signal receiver which comprises a plurality of signal receiving sections each having a signal separating section for separating video data and audio data from a given digital AV signal, and a clock signal generating section for generating, from a given first clock signal, a second clock signal for operating the signal separating section, and a selection section for selecting any one of the plurality of signal receiving sections based on a given select signal, and outputting audio data, video data and a second clock signal output from the selected signal receiving section, a control subject belonging to one of the plurality of signal receiving sections which is not selected by the select signal is paused, where the control subject is at least one of the signal separating section and the clock signal generating section.

Thereby, a control subject belonging to one of the plurality of signal receiving sections which is not selected by the select signal is not operated.

Effect of the Invention

Thus, according to the present invention, only by adding a control section having a relatively small scale to conventional digital signal receivers, a portion which is not required for an operation is paused, depending on the state of the digital signal receiver. Specifically, a portion which is not required in the digital signal receiver is paused when a cable for linking to a transmitter is not connected, when the transmitter, if connected, is not powered ON, when the transmitter, if connected, does is not transmitting valid data, when audio or video data is not included in a digital AV signal, when a plurality of signal receiving sections are exclusively used, or the like, thereby reducing power consumption in the apparatus.

Figure 1:
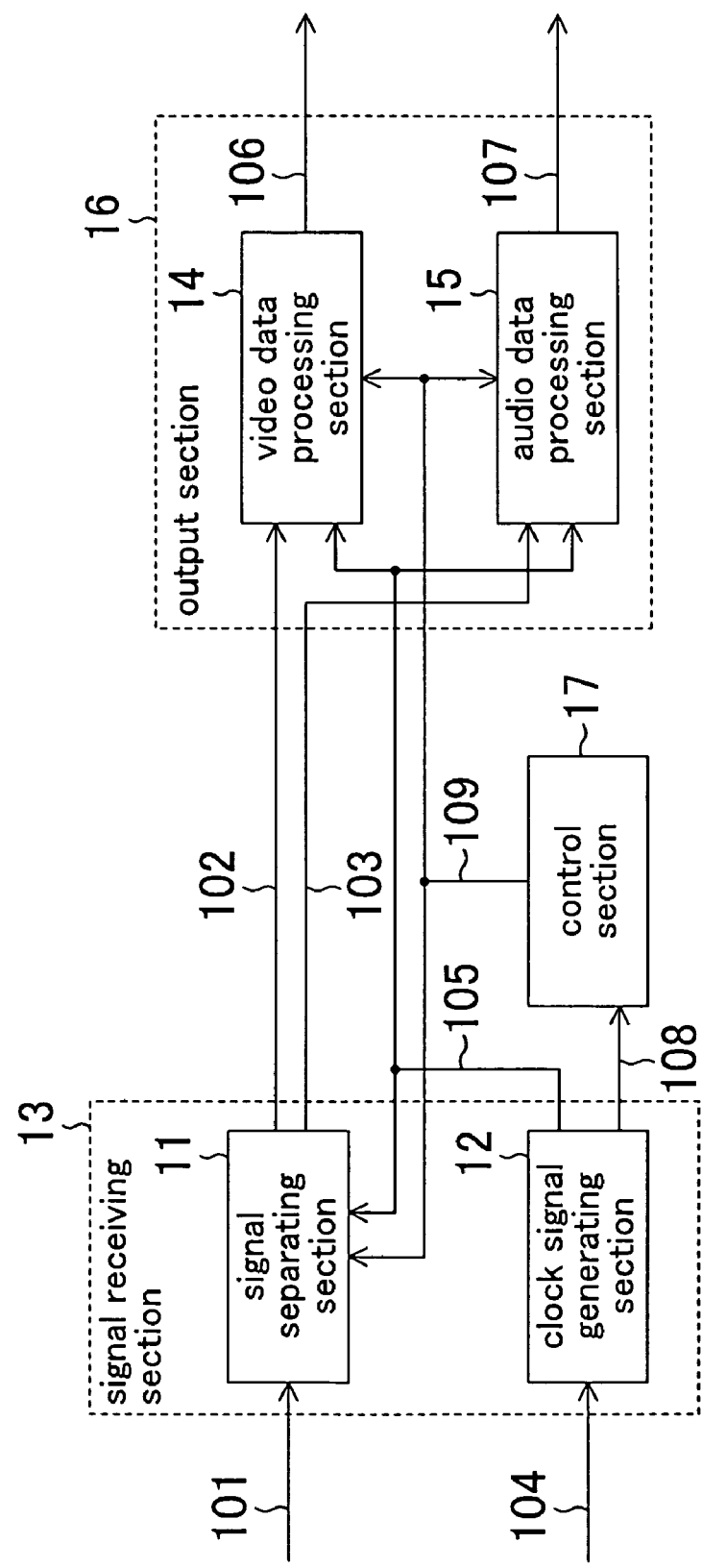
FIG. 1 is a diagram of a configuration of a digital AV signal receiver according to a first embodiment of the present invention.

DESCRIPTION OF THE REFERENCE CHARACTERS 11 signal separating section
12 clock signal generating section
13 signal receiving section
14 video data processing section
15 audio data processing section
17 control section
18 selection section
101 digital AV signal
102 video data
103 audio data
104 clock signal (first clock signal)
105 operation clock signal (second clock signal)
108 clock stability signal
110 determination signal
111 select signal

BEST MODE FOR CARRYING OUT THE INVENTION

Figure 4:
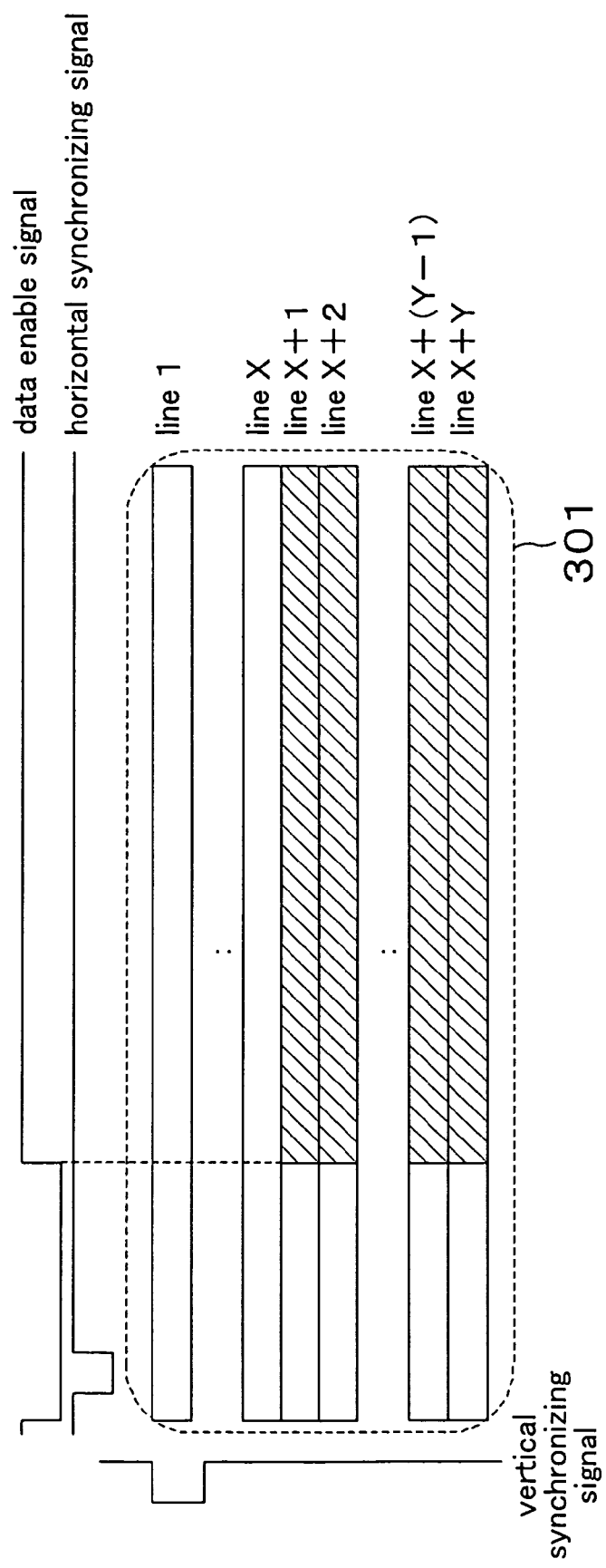
FIG. 4 is a schematic diagram of pre-encoded video and audio signals.

Before describing a best mode for carrying out the present invention, signals which are transmitted in digital AV signal transmission systems in conformity with the DVI standard, the HDMI standard, or the like, will be described. FIG. 4 schematically illustrates an AV signal before being encoded. Line 1 to line X+Y which are output continuously in time series constitute the pre-encoded AV signal (hereinafter simply referred to as a "signal") 301. In the signal 301, hatched portions from line X+1 to line X+Y indicate a video signal, and the other portions indicate an audio signal and a control signal. The control signal includes a vertical synchronizing signal indicating a boundary between each frame, a horizontal synchronizing signal indicating a boundary between each line, a data enable signal indicating a boundary between video data and other data in each line, and the like. In the digital AV signal transmission system, the above-described signal 301 is encoded, and further, is transmitted as a signal by a predetermined transmission technique (e.g., a differential signal).

Hereinafter, the best mode for carrying out the present invention will be described with reference to the accompanying drawings.

First Embodiment

FIG. 1 illustrates a configuration of a digital signal receiver according to a first embodiment of the present invention. The digital signal receiver of this embodiment comprises a signal receiving section 13 composed of a signal separating section 11 and a clock signal generating section 12, an output section 16 composed of a video data processing section 14 and an audio data processing section 15, and a control section 17. The signal separating section 11 restores and decodes encoded data from a given digital AV signal 101, and separates and outputs video data 102 and audio data 103 from the decoded data. The clock signal generating section 12 multiplies a frequency of an input clock signal 104 to output a clock signal 105. Specifically, the clock signal generating section 12 comprises a phase locked loop (not shown), and uses the phase locked loop to multiply the frequency of the clock signal 104 to generate the clock signal 105. The video data processing section 14 processes the video data 102 to output a video signal 106. The audio data processing section 15 processes the audio data 103 to output an audio signal 107. The signal separating section 11, the video data processing section 14, and the audio data processing section 15 are each operated using the clock signal 105 as an operation clock signal.

The clock signal generating section 12 outputs a clock stability signal 108 indicating that the clock signal 105 is stable. As the clock stability signal 108, for example, a lock signal which is output from a phase comparator (not shown) in the phase locked loop, may be used. This is because the outputting of the lock signal from the phase comparator indicates that an output of the phase locked loop is locked to a predetermined frequency.

The control section 17 outputs a control signal 109 to control operating states of the signal separating section 11, the video data processing section 14, and the audio data processing section 15, which are subjects to be controlled. Specifically, the control section 17 pauses the control subject until receiving the clock stability signal 108. After receiving the clock stability signal 108, the control section 17 operates the control subject.

Next, some examples of the control by the control section 17 will be illustrated.

(First control example) The control section 17 interrupts power supplied to the control subject until receiving the clock stability signal 108. After receiving the clock stability signal 108, the control section 17 supplies power to the control subject.

(Second control example) The control section 17 interrupts the clock signal 105 which is supplied to a flip-flop (not shown) in the control subject until receiving the clock stability signal 108. After receiving the clock stability signal 108, the control section 17 supplies the clock signal 105 to each flip-flop.

(Third control example) The control section 17 asserts the control signal 109 as a reset signal with respect to the control subject until receiving the clock stability signal 108. After receiving the clock stability signal 108, the control section 17 desserts the control signal 109.

(Fourth control example) The control section 17 gives a fixed signal, instead of the digital AV signal 101, to the signal separating section 11 until receiving the clock stability signal 108. After receiving the clock stability signal 108, the control section 17 gives the digital AV signal 101 to the signal separating section 11.

By the above-described controls, the signal separating section 11, the video data processing section 14, and the audio data processing section 15 are not operated until the clock signal 105 becomes stable, so that power is not wasted. In addition, the control section 17 has a relatively small circuit scale. Therefore, power consumption in the digital signal receiver can be reduced without increasing the circuit scale.

Note that, even when at least of the signal separating section 11, the video data processing section 14, and the audio data processing section 15 is a control subject, the above-described effect is obtained. Also, the above-described control examples may be combined as appropriate.

Second Embodiment

Figure 2:
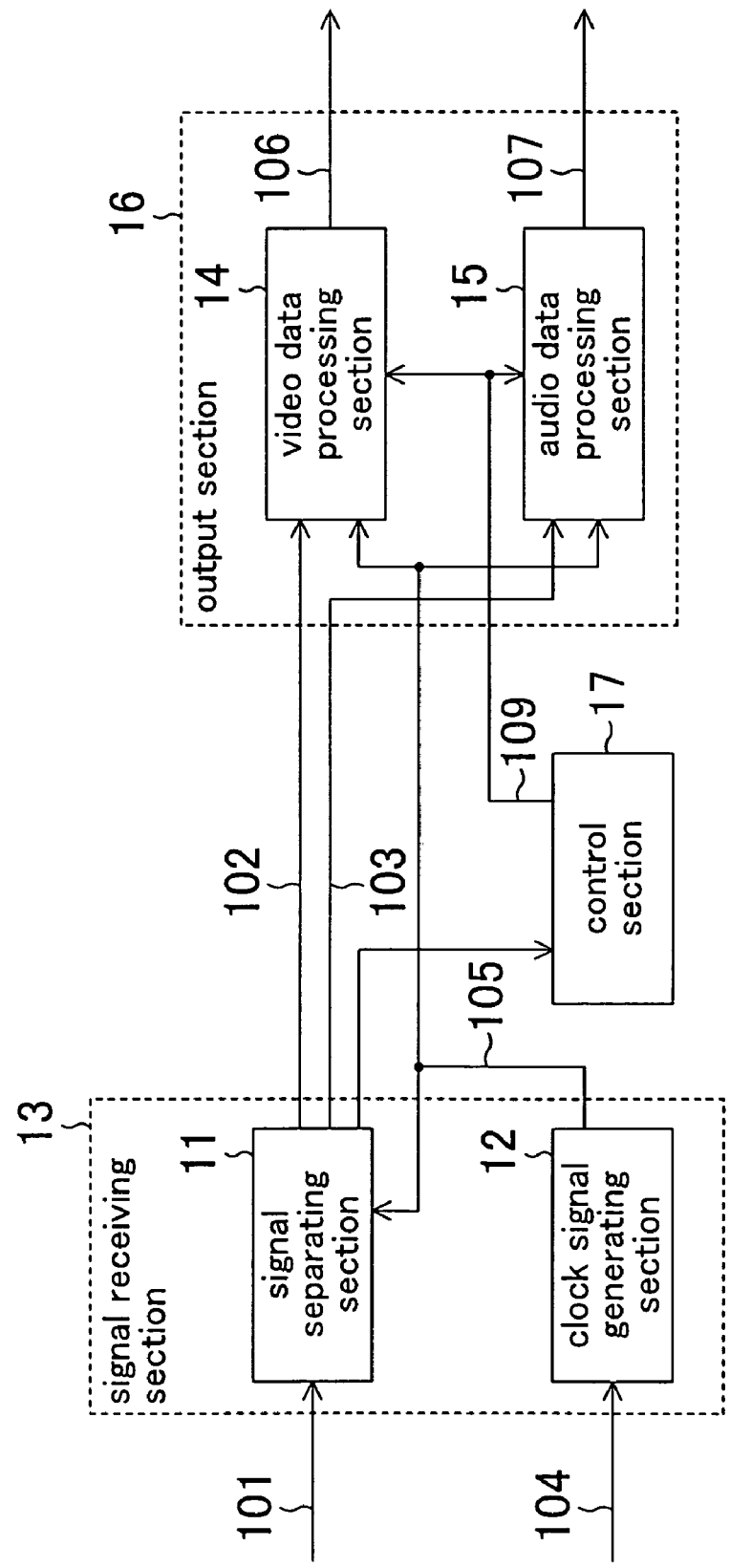
FIG. 2 is a diagram of a configuration of a digital AV signal receiver according to a second embodiment of the present invention.

FIG. 2 illustrates a configuration of a digital signal receiver according to a second embodiment of the present invention. The digital signal receiver of this embodiment is different from that of the first embodiment in the operation of the control section 17. In the other respects, the digital signal receiver of this embodiment is similar to that of the first embodiment and will not be described in detail.

A signal separating section 11 detects whether or not video data and audio data are included in an input digital AV signal 101 to output a determination signal 110 indicating a result of the detection. Specifically, the signal separating section 11 detects whether or not video data is present in data obtained by decoding the digital AV signal 101, and when video data is present, detects whether or not an audio sample packet is present during a video data blanking interval. For techniques of multiplexing and transmitting packet data other than video data during video data blanking intervals, a process of separating packet data and video data is essentially required. The signal separating section 11 outputs information which is secondarily generated in such a separation process, as the determination signal 110.

A control section 17 receives the determination signal 110, and based this, controls operating states of a video data processing section 14 and an audio data processing section 15. Specifically, when the control section 17 determines, based on the determination signal 110, that video data is not included in the digital AV signal 101 for a predetermined time, the control section 17 pauses the video data processing section 14. Also, when the control section 17 determines that an audio sample packet is not included for a predetermined time, the control section 17 pauses the audio data processing section 15.

The video data processing section 14 and the audio data processing section 15 may be paused by interrupting power supply, interrupting a clock, or asserting a reset signal, as in the first to third control examples. Also, these methods may be combined as appropriate.

Thus, according to this embodiment, when video data is not included in the digital AV signal 101, the video data processing section 14 is paused, and when audio data is not included, the audio data processing section 15 is paused, whereby power is not wasted. In addition, the control section 17 has a relatively small circuit scale. Therefore, power consumption in the digital signal receiver is reduced without increasing the circuit scale.

Third Embodiment

Figure 3:
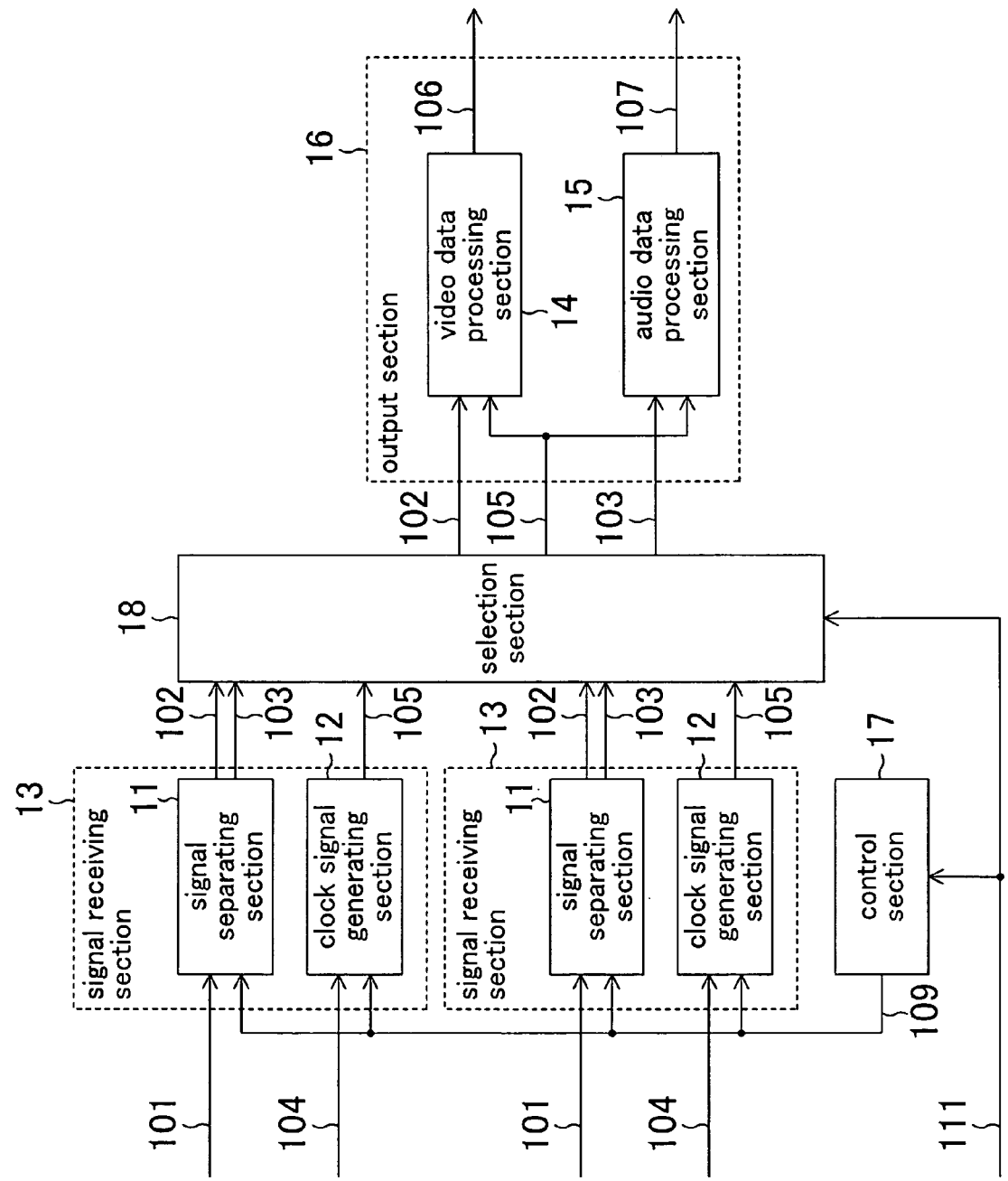
FIG. 3 is a diagram of a configuration of a digital AV signal receiver according to a third embodiment of the present invention.

FIG. 3 illustrates a configuration of a digital signal receiver according to a third embodiment of the present invention. The digital signal receiver of this embodiment comprises two signal receiving sections 13, an output section 16, a control section 17, and a selection section 18, and can receive two channels of digital AV signals 101 and clock signals 104. Note that the signal receiving section 13 and the output section 16 are similar to those of the first embodiment and will not be described.

The selection section 18 receives a select signal 111, and based on this, selects any one of the two signal receiving sections 13. Thereafter, the selection section 18 outputs video data 102, audio data 103, and a clock signal 105 which are received from the selected signal receiving section 13.

The control section 17 receives the select signal 111, and based on this, controls operating states of the signal separating section 11 and the clock signal generating section 12 as control subjects. Specifically, the control section 17 pauses a control subject included in the signal receiving section 13 which is not selected by the select signal 111.

The control subject is paused by interrupting power supply, interrupting a clock, asserting a reset signal, or inputting a fixed signal instead of a digital AV signal, as in the first to fourth control examples. Also, these methods may be combined as appropriate.

Thus, according to this embodiment, a signal receiving section 13 which is not selected is paused, so that power is not wasted. In addition, the control section 17 has a relatively small circuit scale. Therefore, power consumption in the digital signal receiver is reduced without particularly increasing the circuit scale.

Note that the same effect that the present invention exhibits is obtained for a digital signal receiver comprising three or more signal receiving sections 13.

Thus, some embodiments of the present invention have been described. The above-described embodiments may be combined as appropriate.

Also, in each embodiment, the control section 17 may be provided outside the digital signal receiver. Specifically, the operating states of the signal separating section 11, the clock signal generating section 12, the video data processing section 14, and the audio data processing section 15 inside the digital signal receiver may be controlled by an external microcontroller as the control section. Specifically, control information may be written from the external control section into a register inside the digital signal receiver, and by referencing a value of the register, the operating states of the signal separating section 11, the clock signal generating section 12, the video data processing section 14, and the audio data processing section 15 may be controlled.

INDUSTRIAL APPLICABILITY

As described above, the digital signal receiver of the present invention is useful as a receiver in a system which transmits mainly a digital AV signal serially without compression, or, not limited to such a system, a receiver in a transmission system which overlays audio data on video data, a receiver which comprises a plurality of signal receiving sections and uses these exclusively, and the like. Particularly, the digital signal receiver of the present invention is useful as a receiver for which low power consumption is required.

What is claimed is:

1. A digital signal receiver comprising:
   a signal separating section for separating video data and audio data from a given digital AV signal;
   a video data processing section for processing the video data separated by the signal separating section; and
   an audio data processing section for processing the audio data separated by the signal separating section,
   wherein the digital signal receiver comprises a control section for controlling an operating state of a control subject based on a determination signal indicating whether or not video data and audio data are included in the digital AV signal, where the control subject is at least one of the video data processing section and the audio data processing section, and
   the control section pauses the video data processing section and does not pause the audio data processing section when the determination signal indicates that video data is not included and audio data is included in the digital AV signal, and the control section pauses the audio data processing section and does not pause the video data processing section when the determination signal indicates that audio data is not included and video data is included in the digital AV signal.

2. The digital signal receiver of claim 1, wherein the control section pauses the control subject by interrupting supply of power to the control subject.

3. The digital signal receiver of claim 1, comprising:
   a clock signal generating section for generating, from a given first clock signal, a second clock signal for operating the control subject,
   wherein the control section pauses the control subject by interrupting supply of the second clock signal to the control subject.

4. The digital signal receiver of claim 1, wherein the control section pauses the control subject by asserting a reset signal with respect to the control subject.

5. A method for controlling a digital signal receiver, wherein the digital signal receiver comprises:
   a signal separating section for separating video data and audio data from a given digital AV signal;
   a video data processing section for processing the video data separated by the signal separating section; and
   an audio data processing section for processing the audio data separated by the signal separating section,
   wherein the video data processing section is paused and the audio data processing section is not paused when a determination signal indicating whether or not video data and audio data are included in the digital AV signal, indicates that video data is not included and audio data is included in the digital AV signal, and the audio data processing section is paused and the video data processing section is not paused when the determination signal indicates that audio data is not included and video data is included in the digital AV signal.

* * * * *